United States Patent
Reinhardt

(10) Patent No.: US 6,588,446 B2
(45) Date of Patent: Jul. 8, 2003

(54) TIRE VALVE FOR THE RIM OF A PNEUMATIC TIRE ON A VEHICLE

(75) Inventor: Rolf Reinhardt, Giengen/Brenz (DE)

(73) Assignee: Alligator Ventilfabrik GmbH (DE)

( * ) Notice: Subject to any disclaimer, the term of this patent is extended or adjusted under 35 U.S.C. 154(b) by 0 days.

(21) Appl. No.: 09/934,371

(22) Filed: Aug. 21, 2001

(65) Prior Publication Data
US 2002/0023676 A1 Feb. 28, 2002

(30) Foreign Application Priority Data

Aug. 22, 2000 (DE) .......................... 200 14 528
Sep. 7, 2000 (DE) .......................... 200 15 467

(51) Int. Cl.$^7$ .............................. B60C 29/04
(52) U.S. Cl. ...................... 137/223; 152/427
(58) Field of Search .................. 137/223; 152/415, 152/427, 428, 429

(56) References Cited

U.S. PATENT DOCUMENTS

| | | | | |
|---|---|---|---|---|
| 579,934 A | * | 3/1897 | Schwartz | 152/429 |
| 2,275,081 A | * | 3/1942 | Maynard | 152/429 |
| 2,968,333 A | * | 1/1961 | Ayres | 152/427 |
| 3,442,316 A | * | 5/1969 | McMaster | 152/427 |
| 3,635,275 A | * | 1/1972 | Davis et al. | 152/429 |
| 3,712,326 A | * | 1/1973 | Thacker | 137/223 |
| 3,830,277 A | * | 8/1974 | Lejeune | 152/427 |
| 4,049,037 A | * | 9/1977 | Gale et al. | 152/427 |
| 4,294,301 A | * | 10/1981 | Lutz | 152/427 |
| 4,475,578 A | * | 10/1984 | Nidle | 152/415 |
| 4,564,056 A | * | 1/1986 | Doring | 152/427 |
| 4,819,685 A | * | 4/1989 | Pagani | 137/223 |
| 5,694,969 A | * | 12/1997 | DeVuyst | 137/226 |

FOREIGN PATENT DOCUMENTS

EP    0 751 017    1/1997

\* cited by examiner

Primary Examiner—John Rivell
(74) Attorney, Agent, or Firm—Bachman & LaPointe, P.C.

(57) ABSTRACT

In a tire valve (10) for the rim (Q) of a pneumatic tire on a vehicle having a valve body (12) which includes a longitudinal bore (16) and which comprises rigid, in particular metal material with a valve base (20) which is arranged at one end and which has an annular shoulder (24) projecting radially from the valve body (12), the valve body (12) is connected at a spacing to a coaxial valve sleeve (48) by an intermediate tube (44) of elastic material and the valve sleeve (48) can be inclined limitedly with respect to the longitudinal axis (A) of the tire valve (10). The valve sleeve is to comprise rigid material—in particular a metal material—; the intermediate tube (44) bears clampingly at one end against a hollow shank (28) of the valve body (12) and at the other end surrounds the end region of the valve sleeve (48), which is in adjacent relationship at a spacing (u).

18 Claims, 1 Drawing Sheet

TIRE VALVE FOR THE RIM OF A PNEUMATIC TIRE ON A VEHICLE

The invention concerns a tire valve for the rim of a pneumatic tire on a vehicle having a valve body which includes a longitudinal bore and which comprises rigid, in particular metal material with a valve base which is arranged at one end and which has an annular shoulder projecting radially from the valve body.

Such a tire valve can be found in the present applicants' EP 0 751 017 B1. The valve body of that tire valve comprises an anodised aluminum alloy, it includes a valve insert and it terminates at a spacing relative to the rim at a valve cap. By virtue of a male screwthread, the valve body can receive a screw sleeve, with the rim being clamped between the screw sleeve and the annular shoulder of the valve base formed on the valve body. The tire valve terminates within the rim in a signal housing which has two base elements for fitting on to the rim bed and for adjustable mounting in the assembled condition. The connecting element between the tire valve and the signal housing is a hollow screw which engages into the valve bore of the tire valve which bears with the annular shoulder against a seat in the signal housing, the head of the screw bearing against the side, which is remote from the valve, of a longitudinal wall of the signal housing, the screw engaging through the longitudinal wall with clearance.

In consideration of that state of the art the inventor set himself the object of so improving a tire valve of the kind set forth in the opening part of this specification that it can be more easily handled and can be more universally employed.

That object is attained by the teaching of the independent claim; the appendant claims set forth advantageous developments. The scope of the invention also embraces all combinations of at least two of the features disclosed in the description, the drawing and/or the claims.

In accordance with the invention the valve body is connected to a coaxial valve sleeve—preferably of rigid material—by an intermediate tube of elastic material, and the valve sleeve is inclinable limitedly in relation to the longitudinal axis of the tire valve. That elastic intermediate tube bears at one end clampingly against a hollow shank of the valve body and at the other end surrounds as a central valve component the end region of the valve sleeve, which is disposed in adjacent spaced relationship.

Those features afford a tire valve which is elastic bendable approximately in its axial central region—and also restorable—and which in accordance with the stated object is considerably better to handle than a tire valve which is rigid in itself.

The valve body which here determines only a part of the valve length is of such a configuration that the mouth of the longitudinal bore of the hollow shank is arranged at a head tube which delimits thereon a radial annular shoulder towards the axis; this valve body is therefore provided with at least two annular shoulders of which one—at the valve base—projects from the hollow shank while the other forms a return configuration in the cross-section of the hollow shank. For that purpose it has been found desirable that, in the region of the mouth opening of the hollow shank, at least one external ridge or bead projects radially from the hollow shank—at a spacing relative to the adjacent internal annular shoulder—, the external bead forming an outwardly protruding support for the intermediate tube.

For the purposes of fixing the intermediate tube the valve body is to be at least partially surrounded by a screw sleeve which extends at a radial gap spacing relative to the external bead of the hollow shank and forms therewith a paired clamping configuration for the intermediate tube. It is possible for that screw sleeve to be connected in force-locking relationship to a region of the intermediate tube, which region bears against the screw sleeve at the inside thereof, the screw sleeve being for example glued in position or—preferably—subjected to a vulcanising procedure; in this embodiment it is attached to the unit consisting of the valve sleeve and the intermediate tube and is to be removed therewith from the valve body without any problem.

In accordance with a further feature of the invention the end region of the intermediate tube, which is associated with the valve sleeve, is preferably vulcanised to the adjacent sleeve surface. In addition, in the region of an annular edge of the intermediate tube, an external ring should bear against the intermediate tube at the inside thereof, which external ring is formed on the valve sleeve—to be provided at the free end thereof with a valve cap—and is also fixedly connected to the intermediate tube by a vulcanising procedure.

A ring of elastic material which is arranged between the annular shoulder of the valve base and the oppositely disposed lower edge of the screw sleeve has proven to be advantageous, as a support element for the rim; that ring can be deformed by the pressing pressure of the screw sleeve and can be caused to bear against an edge of the opening in the rim. For the purposes of improved mounting and pressure distribution at the elastic ring, an annular disk of rigid material can also be inserted between the elastic ring and the lower edge of the screw sleeve.

The tire valve according to the invention is for example about 60 mm in length and the free spacing between the valve body and the valve sleeve should approximately correspond to between a sixth and a seventh of that valve length. For that purpose it has been found desirable for the length of the intermediate tube to be so selected as to approximately correspond to the length of the valve body or the length of the valve sleeve; the length of the valve body should be somewhat greater than the length of the sleeve.

In order to impart good stability to the tire valve in accordance with a further feature of the invention the length of the overlap region of the intermediate tube and the screw sleeve should approximately correspond to between a third and a quarter of the length of the valve body and/or the length of the overlap region of the intermediate tube and the valve sleeve should approximately correspond to between a third and a half of the length of the valve sleeve.

The tire valve designed in accordance with the invention has proven in internal tests conducted by the applicants to be extremely handleable with a high degree of stability.

Further advantages, features and details of the invention will be apparent from the description hereinafter of a preferred embodiment and with reference to the drawing in which.

Figures 1, 2:
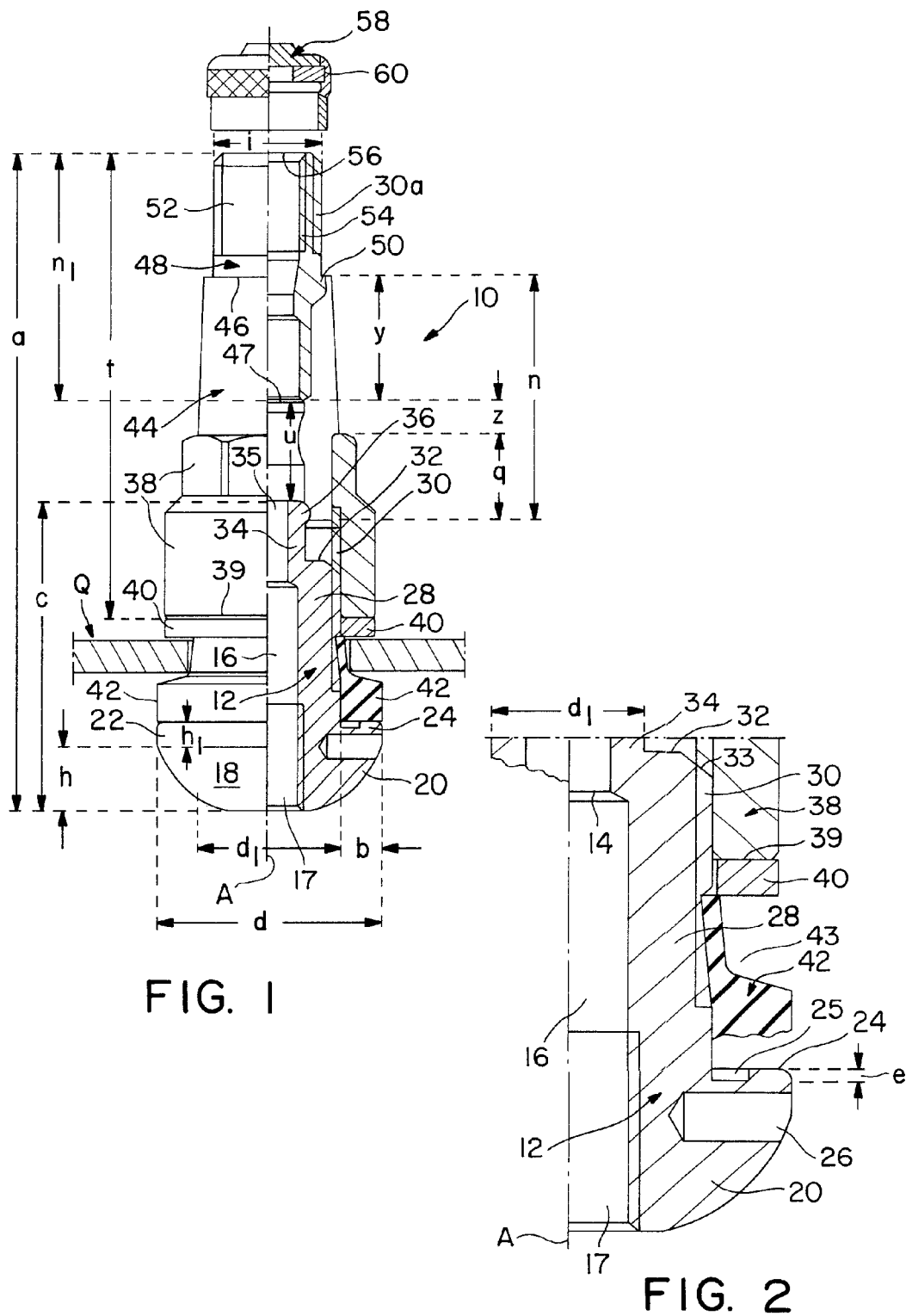
FIG. 1 is a partly sectional side view of a tire valve.
FIG. 2 is a view on an enlarged scale of a part of FIG. 1.

A tire valve 10 of a length a of here 54 mm for a motor vehicle tire (not shown) is provided with a tubular valve body 12 of a length c of 25 mm, comprising a metal alloy—preferably a brass alloy—and the valve body has on the longitudinal axis A of the valve a longitudinal bore 16 which is stepped at 14 and which opens at a dome-shaped end face 18 of a valve base 20 of the valve body 12. The first portion of the axial bore 16, which starts from the end face 18 of the height indicated at h of 5 mm, is in the form of a screwthreaded bore 17 for receiving a hollow steel connecting screw (not shown) which at the other end serves for fixing a wheel electronic system.

Adjoining the end face 18 of the valve base 20 is a cylindrical portion 22 of a small height $h_1$ and of an outside diameter as indicated at d of 16 mm, which at the other end goes into an inwardly displaced annular shoulder 24 of a width b of 3 mm; it is divided in respect of cross-section and it is provided in its inner region with an annular groove 25 of a depth e which is shaped to extend therearound. A radial blind bore 26 can be seen beneath the annular shoulder 24, in the valve base 20.

The annular shoulder 24 embraces a hollow shank 28 of the valve body 12 with a male screwthread 30, which involves an outside diameter $d_1$ of about 10 mm and which, at an upper annular shoulder 32—with an edge 33 which is chamfered in a desk-like configuration in longitudinal section—, goes into an axial head tube 34 which is formed thereon and which is of smaller outside diameter; the mouth opening 35 thereof is surrounded by a radial external ridge or bead 36 and its outside diameter is also smaller than the outside diameter d of the cylindrical portion 22 of the valve base 20. Disposed in opposite relationship to the external bead 36 at a radial spacing is a screw sleeve 38 screwed to the male screwthread 30 of the hollow shank 28.

The lower edge 39 of the screw sleeve 38, being the edge which is directed towards the annular shoulder 24, bears against an elastic ring 42, with the interposition of a metal annular disk 40. The elastic ring 42 includes a shaped recess 43 therein which extends therearound on the outside thereof and into which regions of a rim Q of the motor vehicle tire can be introduced. The ring 42 is fitted at the other end on to the annular shoulder 24 and can be clamped towards same by rotation of the screw sleeve 38.

The one end of an intermediate tube 44 of a length n of 20 mm of elastic material is held between the external bead 36 of the tube head 34 and the screw sleeve 38, in force-locking relationship, by the clamping force of the elastic material and the screw sleeve 38. The screw sleeve 38 engages over the intermediate tube 44 over an axial overlap q of in this case 7 mm. In this region, the two components 38, 40 can also be connected together by vulcanisation.

A valve sleeve 48 of a length $n_1$ of 20 mm comprising a material corresponding to the metal material of the screw sleeve 38 is fitted into and vulcanised to the upper end of the intermediate tube 44, which is defined by an annular edge 46—by way of a region adjoining a lower mouth opening edge 47; in that case, an outer ring 50 formed on the valve sleeve 48, with the region of the elastic intermediate ring 44 adjoining the annular edge 46, forms a further pairing of components connected by vulcanisation. The overlap dimension y is in this case 10 mm, and the free spacing u between the mouth opening edge 47 and the external bead 36 is somewhat more than 8 mm.

Projecting out of the elastic intermediate tube 44 of a free length z which remains between the overlap portions is a screw end 52 of the valve sleeve 48, which end 52 is provided both with a male screwthread $30_a$ and also with a female screwthread 54. The outside diameter i of the screw end 52 measures about 7 mm while the spacing t between that lower edge 39 of the screw sleeve 38 and the mouth opening edge 56 of the valve sleeve 48 is about 38 mm. Reference 58 also denotes a valve cap of anodised aluminum alloy which can be screwed on to the valve sleeve 48 while disposed in the valve cap is a sealing ring 60 which can be applied in the closing direction to the mouth opening edge 56.

For reasons of clarity of the drawing the movable internal components of the tire valve 10 with their valve stem rod displaceable against a spring are not shown.

What is claimed is:

1. A tire valve (10) for the rim (Q) of a pneumatic tire on a vehicle having a valve body (12) which includes a longitudinal bore (16) and which comprises rigid, in particular metal material with a valve base (20) which is arranged at one end and which has an annular shoulder (24) projecting radially from the valve body (12), characterised in that the valve body (12) is connected at a spacing to a coaxial valve sleeve (48) by an intermediate tube (44) of elastic material and the valve sleeve (48) can be inclined limitedly with respect to the longitudinal axis (A) of the tire valve (10).

2. A tire valve as set forth in claim 1 characterised in that the valve sleeve comprises rigid material, in particular a metal material.

3. A tire valve as set forth in claim 1 characterised in that the intermediate tube (44) bears clampingly at one end against a hollow shank (28) of the valve body (12) and at the other end surrounds the end region of the valve sleeve (48), which is in adjacent relationship at a spacing (u).

4. A tire valve as set forth in claim 1 characterised in that the mouth opening (35) of the longitudinal bore (16) of the hollow shank (28) is arranged on a head tube (34) delimiting thereon towards the axis an annular shoulder (32).

5. A tire valve as set forth in claim 1 characterised in that in the region of the mouth opening (35) of the hollow shank (28) projecting radially therefrom is at least one external bead (36) forming an outwardly protruding support for the intermediate tube (44).

6. A tire valve as set forth in claim 1 characterised in that the valve body (12) is at least partially surrounded by a screw sleeve (38) which extends at a radial spacing with respect to the external bead (36) of the hollow shank (28) and forms therewith a clamping pairing arrangement for the intermediate tube (44).

7. A tire valve as set forth in claim 6 characterised in that the screw sleeve (38) is connected in surface contact in force-locking surface relationship with a region of the intermediate tube (44), which bears against the screw sleeve at the inside.

8. A tire valve as set forth in claim 6 characterised in that the screw sleeve (38) is connected by a vulcanisation procedure to a region of the intermediate tube (44) which bears against the screw sleeve at the inside.

9. A tire valve as set forth in claim 1 characterised in that the end region of the intermediate tube (44) which is associated with the valve sleeve (48) is connected in force-locking relationship to the adjacent sleeve surface.

10. A tire valve as set forth in claim 9 characterised in that the end region of the intermediate tube (44) which is associated with the valve sleeve (48) is vulcanised to the adjacent sleeve surface.

11. A tire valve as set forth in claim 3 characterised in that in the region of an annular edge (46) of the intermediate tube (44) an external ring (50) of the valve sleeve (48) bears against the intermediate tube at the inside, the external ring being connected in surface contact in force-locking relationship to the intermediate tube.

12. A tire valve as set forth in claim 11 characterised in that the external ring (50) is connected to the intermediate tube (44) by a vulcanising procedure.

13. A tire valve as set forth in claim 1 characterised in that a ring (42) of elastic material as a support member for the rim (Q) extends between the annular shoulder (24) of the valve base (20) and the oppositely disposed lower edge (39) of the screw sleeve (38) and an annular disk (40) of rigid material is provided between the lower edge (39) of the screw sleeve (38) and the elastic ring (42).

14. A tire valve as set forth in claim 1 characterised in that the free spacing (n) between the valve body (12) and the valve sleeve (48) corresponds approximately to between a sixth and a seventh of the valve length (a).

15. A tire valve as set forth in claim 1 characterised in that the length (n) of the intermediate tube (44) corresponds approximately to the length (c or $n_1$) of the valve body (12) and the valve sleeve (48) respectively.

16. A tire valve as set forth in claim 1 characterised in that the length (c) of the valve body (12) is somewhat greater than the length ($n_1$) of the sleeve (48).

17. A tire valve as set forth in claim 1 characterised in that the length (q) of the overlap region of the intermediate tube (44) and the screw sleeve (38) corresponds approximately to between a third and a quarter of the length (c) of the valve body (12).

18. A tire valve as set forth in claim 1 characterised in that the length (y) of the overlap region of the intermediate tube (44) and the valve sleeve (48) corresponds approximately to between a third and half the length ($n_1$) thereof.

* * * * *